(12) United States Patent
Tee et al.

(10) Patent No.: US 6,931,066 B2
(45) Date of Patent: Aug. 16, 2005

(54) MOTION VECTOR SELECTION BASED ON A PREFERRED POINT

(75) Inventors: Swee-San Tee, Singapore (SG);
Kah-Ho Phong, Singapore (SG);
Jean-Michel Bard, Meylan (FR);
Lucas Y. W. Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 57 days.

(21) Appl. No.: 10/715,894

(22) Filed: Nov. 18, 2003

(65) Prior Publication Data

US 2004/0179604 A1 Sep. 16, 2004

(30) Foreign Application Priority Data

Nov. 18, 2002 (SG) ........................................ 200206970-6

(51) Int. Cl.⁷ ............................................... H04N 7/12
(52) U.S. Cl. ............................ 375/240.16; 375/340.12; 348/402.1
(58) Field of Search ................. 375/240.12, 240.15, 375/240.16; 348/402.1; H04N 7/12

(56) References Cited

U.S. PATENT DOCUMENTS

| 5,327,232 | A | | 7/1994 | Kim ........................... 348/412 |
| 5,473,379 | A | * | 12/1995 | Horne ..................... 375/240.16 |
| 5,610,657 | A | * | 3/1997 | Zhang .................... 375/240.16 |
| 5,717,615 | A | | 2/1998 | Pirson et al. ........... 364/715.01 |
| 6,256,343 | B1 | * | 7/2001 | Suzuki ....................... 375/240 |
| 6,285,714 | B1 | * | 9/2001 | Kawaguchi et al. .... 375/240.21 |
| 6,449,312 | B1 | * | 9/2002 | Zhang et al. ........... 375/240.16 |

FOREIGN PATENT DOCUMENTS

| EP | 0831642 | * | 3/1998 | ............ H04N/5/15 |
| EP | 0866619 | * | 9/1998 | ............ H04N/7/26 |

OTHER PUBLICATIONS

U.S. Appl. No. 09/807,497, filed Apr. 4, 2001, Hui et al.*

* cited by examiner

Primary Examiner—Kamini Shah
(74) Attorney, Agent, or Firm—Lisa K. Jorgenson; E. Russell Tarleton; Seed IP Law Group PLLC (57) ABSTRACT

A method of selecting a motion vector for use in a motion estimation system in which the motion vector defines movement of a block of pixels between a search window and a reference frame. The method includes the steps of scanning a search window in a fixed order for a suitable match with an area of the reference frame such that each search position within a current row or column of the window is one pixel away from a previous search position, defining a preferred point in the search window, calculating a primary norm function with reference to the preferred point for a given position in each row or column, calculating a norm function for each search position based on a linear increment of the primary norm function for the respective row or column, calculating an Absolute Error (AE) for each search position, based on a difference between a given property of the search position and a position in the reference window, and selecting a motion vector, the displacement of the motion vector defined in terms of the search position having the smallest AE and the smallest norm function. An apparatus for performing the method is also disclosed.

16 Claims, 5 Drawing Sheets

MOTION VECTOR SELECTION BASED ON A PREFERRED POINT

BACKGROUND OF THE INVENTION

1. Field of the Invention

The present invention relates to a method and associated apparatus for selecting motion vectors for use in a video motion estimator. Such video motion estimators are typically used in video processing applications, particularly for the purpose of video compression.

2. Description of the Related Art

MPEG (Moving Picture Expert Group) standards are used in many current and emerging video products. They are implemented in digital television set-top boxes, video-telephone, High Definition Television (HDTV) decoders, video conferencing and other applications. These applications benefit from video compression in that they require less storage capacity for archived video information, less bandwidth for the transmission of the video information, or a combination of both.

Various video compression techniques are used to reduce the substantial amount of data involved in encoding video images. One such example is a transform coding using a Discrete Cosine Transform (DCT) process that reduces spatial correlation. Another example is motion compensation coding that reduces temporal correlation between two successive frames.

The motion compensation is used to predict the current frame data from previous frame data based on an estimation of motion between the current and the previous video frame. The premise of this motion estimation is that in most cases, consecutive video frames will be similar except for changes induced by objects moving within the frames. In the trivial case of zero motion between frames, it is easily and efficiently predicted that the current frame is a duplicate of the prediction frame. In such a case, the only information needed to be transmitted to the decoder is the syntactic overhead (i.e., the coding scheme used to indicate the identity between successive frames) necessary to reconstruct the picture from the original reference frame.

When there is motion in the images, the displacement of part of the current frame with respect to previous or future frame is estimated. Therefore, one or more motion vectors, representing the displacement of certain pixels between the previous and the current frames, are determined to represent the motion.

Motion vectors from a sequence of video frames are usually determined by a block matching algorithm. The algorithm is arranged to search for the best match block of the current frame from the candidate blocks inside a search window in the reference frame. The block matching algorithm divides the image into square blocks which contain 'N×N' pixels, and then compares each block in the current frame (current block) with those within a reduced area of the reference frame (search window) looking for the closest match.

Absolute error (AE) is the sum of differences in the luminance level of all pixels between the current block and reference block. And the smallest AE among the calculated AEs is used to determine the motion vector as a measure of the displacement of the pixels between the reference block and the candidate block in the search window. Alternatively, Square Error (SE), the square of the sum of differences in the luminance level of all pixels between the current block and the reference block, may be used for motion vector determination.

Within a search window, there may be a plurality of equivalent AEs found during block matching. This particular problem is addressed in U.S. Pat. No. 5,327,232. According to this patent, the AEs are compared and a subset, consisting of all minimum AEs equal to the smallest value, is defined. A further subset of candidate vectors from the subset of said minimum AEs is then derived. Each candidate vector, representing the displacement of the pixels between the current block and the search window, represents the corresponding AE equal to the smallest value. A predetermined motion vector, retrieved from a storage means, is compared with the subset of said candidate vectors to determine the candidate vector closest to the predetermined motion vector. The closest candidate vector is defined as the motion vector of the current block and is then stored in the storage means as the predetermined motion vector for subsequent current blocks.

A norm function with reference to a user defined preferred point can be used to select one of the motion vectors, the preferred point having been previously described in the search window. According to U.S. Pat. No. 5,717,615, the norm function of the said vectors is created according to the function: max $\{|X|, |Y|\}$ or $\sqrt{(X^2+Y^2)}$, where X and Y represent the co-ordinates of a vector. The norm of the search points are computed and compared when the corresponding AE values are equal to the said smallest AE.

Calculation of the norm function for each position in the search window demands a large amount of computational capacity. The cost of implementing $\sqrt{(X^2+Y^2)}$ for each position is high as a large processing capacity must be provided. The accuracy of max $\{|X|, |Y|\}$ affects the quality of detected motion vectors, and hence the decoded image. It is therefore difficult to use approximations to reduce the computational overhead without adversely affecting image quality.

Typically, multiple systolic arrays (e.g., 4×16×8, or 8×8×8, etc) are used for searching a larger search window. The number of norm functions to be calculated is proportional to the number of arrays. Furthermore, the number of comparators required to compare AEs in parallel with the norms is significantly increased. For each search position, two comparators are needed for the AE and the norm value. Therefore, for a multiple systolic array of 4×16×8, two comparators are needed for sequential comparison. If the number of multiple systolic arrays is increased to four, 4×2 comparators are required for determination of the motion vector.

BRIEF SUMMARY OF THE INVENTION

According to a first aspect of the present invention, there is provided a method of selecting a motion vector for use in a motion estimation system, said motion vector defining movement of a block of pixels between a search window and a reference frame, said method including the steps of:

scanning a search window in a fixed order for a suitable match with an area of the reference frame such that each search position within a current row or column of the window is one pixel away from a previous search position;

defining a preferred point in the search window;

calculating a primary norm function with reference to the preferred point for a given position in each row or column;

calculating a norm function for each search position based on a linear increment of the primary norm function for the respective row or column;

calculating an Absolute Error (AE) for each search position, based on a difference between a given property of the search position and a position in the reference window; and selecting a motion vector, the displacement of the motion vector being defined in terms of the search position having the smallest AE, or if more than one search position has the same smallest AE, the search position having the smallest norm function is selected.

Preferably, the step of calculating the primary norm function for a given position includes the step of calculating the square of the distance between the preferred point and the current search point. The square of the distance is used, as this obviates the need to perform a square root operation, and only relative values of the norm function are needed.

Preferably, the linear increment for each row or column is (1+2X) or (1+2Y) respectively, where X and Y refer to the respective co-ordinates of the current search position. In this way, adjacent search positions may be evaluated without the need to perform computationally complex, and hence, lengthy, square calculations.

Advantageously, such a linear increment in no way detracts from the accuracy of the calculation.

Multiple systolic array arrangements may be used to increase speed of calculation. This allows pre-selection of multiple scan positions and reduces multiple calculations and comparisons of AE and norm values.

Preferably, a pre-selected motion vector is determined on the basis of the AE calculations for said plurality of positions, and the motion vector is selected on the basis of the AE and norm functions of the pre-selected motion vectors.

Preferably, the calculated AE results for said plurality of positions are sorted according to the distance of their row or column position from the preferred point, and the pre-selected motion vectors are determined on the basis of the sorted AE results.

Preferably, the method may be used within the framework of the MPEG standards. In particular, the reference frame may be one of a forward, backward, or interpolated frame.

In the foregoing method, a Square Error (SE) calculation may be used in place of the Absolute Error (AE) calculation.

According to a second aspect of the present invention, there is provided a motion estimation device for calculating a motion vector defining a displacement between a block of pixels in a search window and a block of pixels in a reference frame, including:

means for scanning a search window in a fixed order for a suitable match with an area of the reference frame such that each search position within a current row or column of the window is one pixel away from a previous search position;

means for defining a preferred point in the search window;

means for calculating a primary norm function with reference to the preferred point for a given position in each row or column;

means for calculating a norm function for each search position based on a linear increment of the primary norm function for the respective row or column;

means for calculating an Absolute Error (AE) for each search position, based on a difference between a given property of the search position and a position in the reference window; and means for selecting a motion vector, the displacement of the motion vector being defined on the basis of the search position having the smallest AE, or if more than one search position has the same smallest AE, means for selecting the search position having the smallest norm function.

A method of selecting a motion vector for use in a motion estimation system is provided, the motion vector defining movement of a block of pixels between a search window and a reference frame, the method including: scanning a search window such that each search position is one pixel away from a previous search position; calculating a primary norm function with reference to a preferred point for a given position; calculating a norm function for each search position based on a linear increment of the primary norm function for a respective row or column; calculating an Absolute Error (AE) for each search position; and selecting a motion vector having a displacement defined in terms of the search position having the smallest AE and the smallest norm function.

DETAILED DESCRIPTION OF THE INVENTION

Using a fixed scanning order for the search window, e.g., left-to-right, top-to-bottom, the distance between the previous search position and the current search position is one pixel horizontally (or vertically) within the current scan column (or row). Therefore, it is only necessary to update one co-ordinate to minimize calculation of the norm during the scan.

Furthermore, if $Norm_i$ of a current position i is $(X^2+Y^2)$, the $Norm_{i+1}$ of the next scan position i+1 is given by $((X+1)^2+Y^2)$ or $(X^2+2X+1+Y^2)$; hence $Norm_{i+1}=Norm_i+(2X+1)$. This result means that mathematical square operations can be avoided during the scan by utilizing previously stored norm values.

For the case of a multiple systolic array implementation, or parallel scanning of several search positions, the scan positions are aligned to the same row and sorted according to the column distance from the preferred point as the row distances are the same. This will allow pre-selection of the multiple scan positions and therefore minimizes multiple calculations of the norm values as well as the number of comparisons required.

A current block of pixels is selected from the current frame, and a larger block of pixels, called a search window, is selected from the reference frame. A preferred point, which is defined by a user, is set in the search window. The preferred point is a fixed point, which serves as a reference for all norm calculations. Any point located outside the search window can be truncated to the closest point within the search window. Every position in the search window is then compared with the current block, the comparison starting from a corner of the search window. $X^2$ and $Y^2$ for the norm function is calculated and stored with reference to the starting scan point and the preferred point.

The scanning process to determine the best match block is performed column-by-column first then followed by row-by-row. The Absolute Error (AE) between the current block and the candidate block from the search window is used to determine and define the best match block during the scanning process. During the scanning process, a norm function is calculated for each search position to determine the distance between the starting scan point and the preferred point. A norm is calculated for each search position by updating only one of either the $X^2$ term or the $Y^2$ term depending on whether the search position is changing by a column or a row. The updating process may be further simplified to the form of a $1\pm 2X$ or $1\pm 2Y$ increment as appropriate.

In the scanning process, it would be desirable and convenient to find only one minimum AE over the entire search window active with the corresponding current block. However, there may be a plurality of equivalent minimum AEs found during the process. If there are multiple positions with the same minimum AE, the choice of motion vector will be based on the norm function. In particular, the position with the smallest norm will determine the displacement of the vector. This means that the search position where the starting scan point is closer to the preferred point will determine and define the displacement of the vector.

In order to ease the selection of the motion vector, when multiple search positions are scanned simultaneously, the resulting AEs and norms are sorted according to the row position with reference to the preferred point. Firstly, the selection is made based on the lowest AEs and sort order. Sort order represents the selected row position with reference to the preferred point. Then the output is compared with the previous results of AEs. When the AE values are equal, corresponding norm values are compared to determine the motion vector, with the smallest norm determining and defining the optimum vector.

Figure 1:
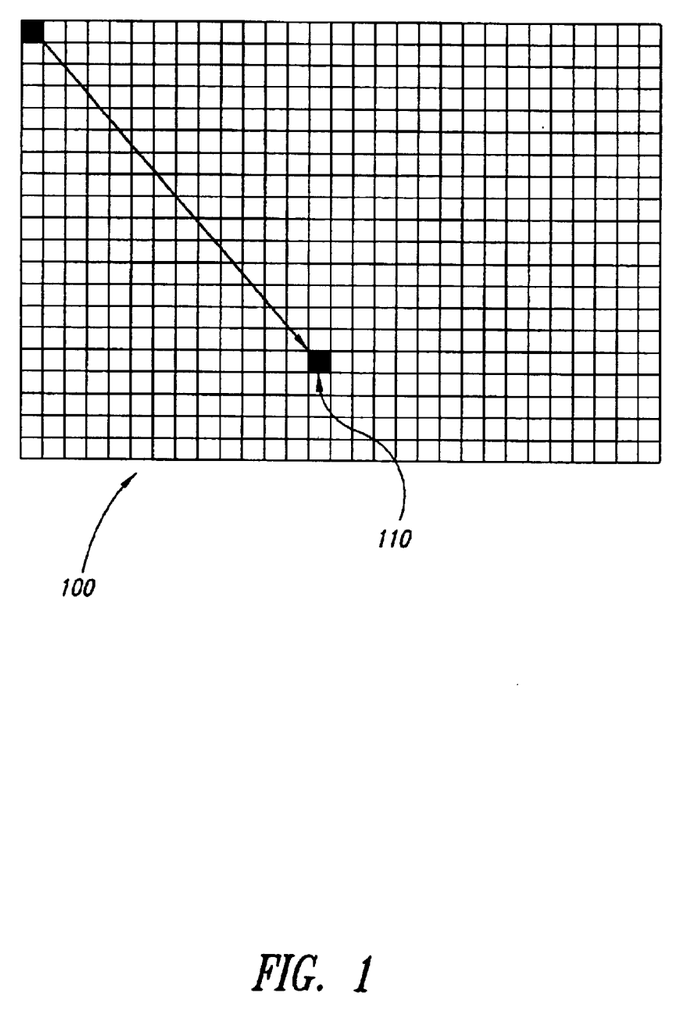
FIG. 1 is a block diagram of a search window showing the rows of search positions and the preferred point.

Referring to FIG. 1, there is shown a search window 100 in a grid format where each grid area is equal to 1 pixel. An example preferred point 110 is defined for the search window as illustrated in FIG. 1. For a scanning order running from left-to-right and top-to-down, when the scanning of the first row of search positions is completed, a new vertical iteration scan is executed, and it scans the next row of search positions, starting at the same horizontal position. The AEs and the distances with reference to the preferred point of this new row of search position are calculated. The vertical iteration is repeated until the bottom of the search window is reached.

Figure 2A:
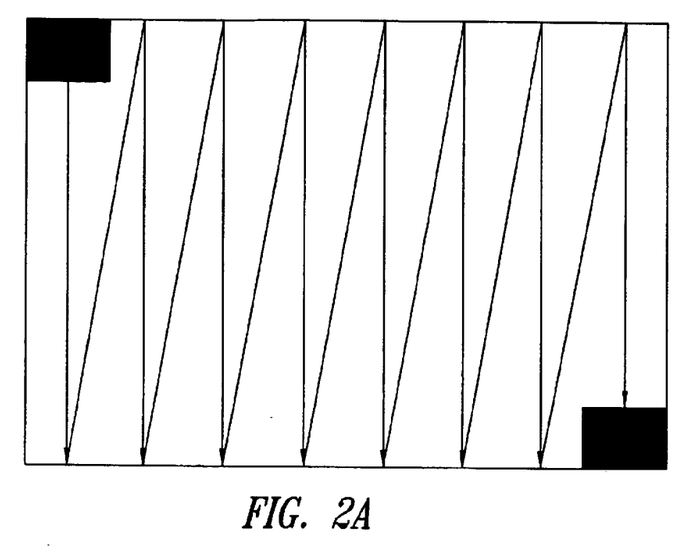
FIG. 2A is a block diagram showing the scanning order of a search process in a search window.
Figure 2B:
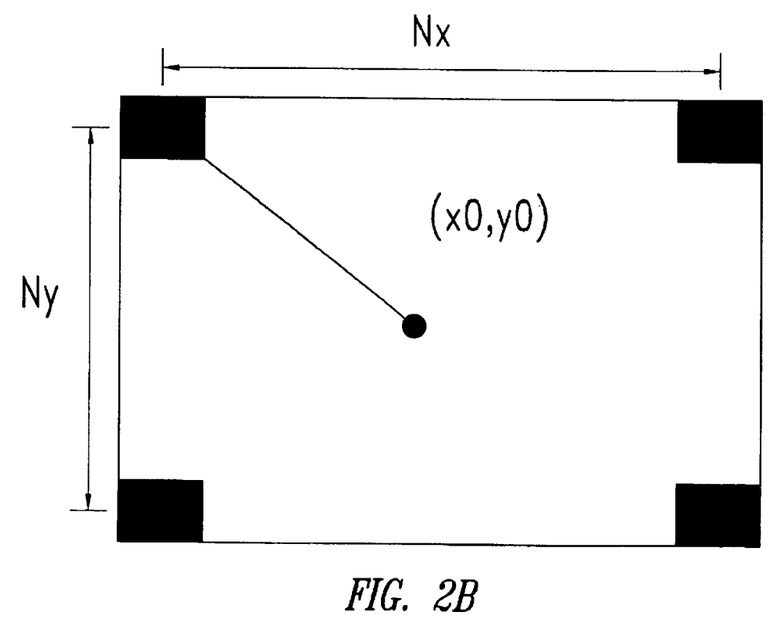
FIG. 2B is a block diagram showing the distance between two co-ordinates in a search window.

As shown in FIG. 2A, the first block to be scanned with the current block is located at the top left corner of the search window. The scanning process continues with blocks in the same column, from top to bottom. A new horizontal iteration will be started at the new horizontal position when a column of vertical iteration is finished. The vertical and horizontal iteration is repeated until the whole search window has been scanned. (x) and (y) co-ordinates therefore continue increasing by one pixel during the scan of the search window. The values of x0 and y0 correspond to the preferred point of the search window with respect to the position of the current block. This relation is illustrated in FIG. 2B.

During the scanning process, the search position which gives the smallest value of AE is determined and defined as the best AE of the current search mode. When there are equivalent values of AE for other search positions in the same search mode, a norm function is used to determine the position having the best AE. The norm function is defined as $\sqrt{(X^2+Y^2)}$, whereby the square root can be removed during computation, as this is common to all calculations, and only relative values are required. This norm function represents the distance of the starting search position of the current block with reference to the preferred point in the search window. The starting search position of the current block is at the top left corner, therefore the first norm function calculated will be the distance between the co-ordinate x and y of top left point of current block with reference to the co-ordinate x and y of preferred point. The norm function can be defined as:

$$(topleft\_x - prefer\_x)^2 + (topleft\_y - prefer\_y)^2$$

The scanning order is left-to-right and top-to-down and the search window area is divided into a grid format of pixel by pixel. Therefore, for a new vertical iteration, the distance between the previous search position and current search position is one pixel vertically, and for a horizontal iteration, it is one pixel horizontally.

Figure 3:
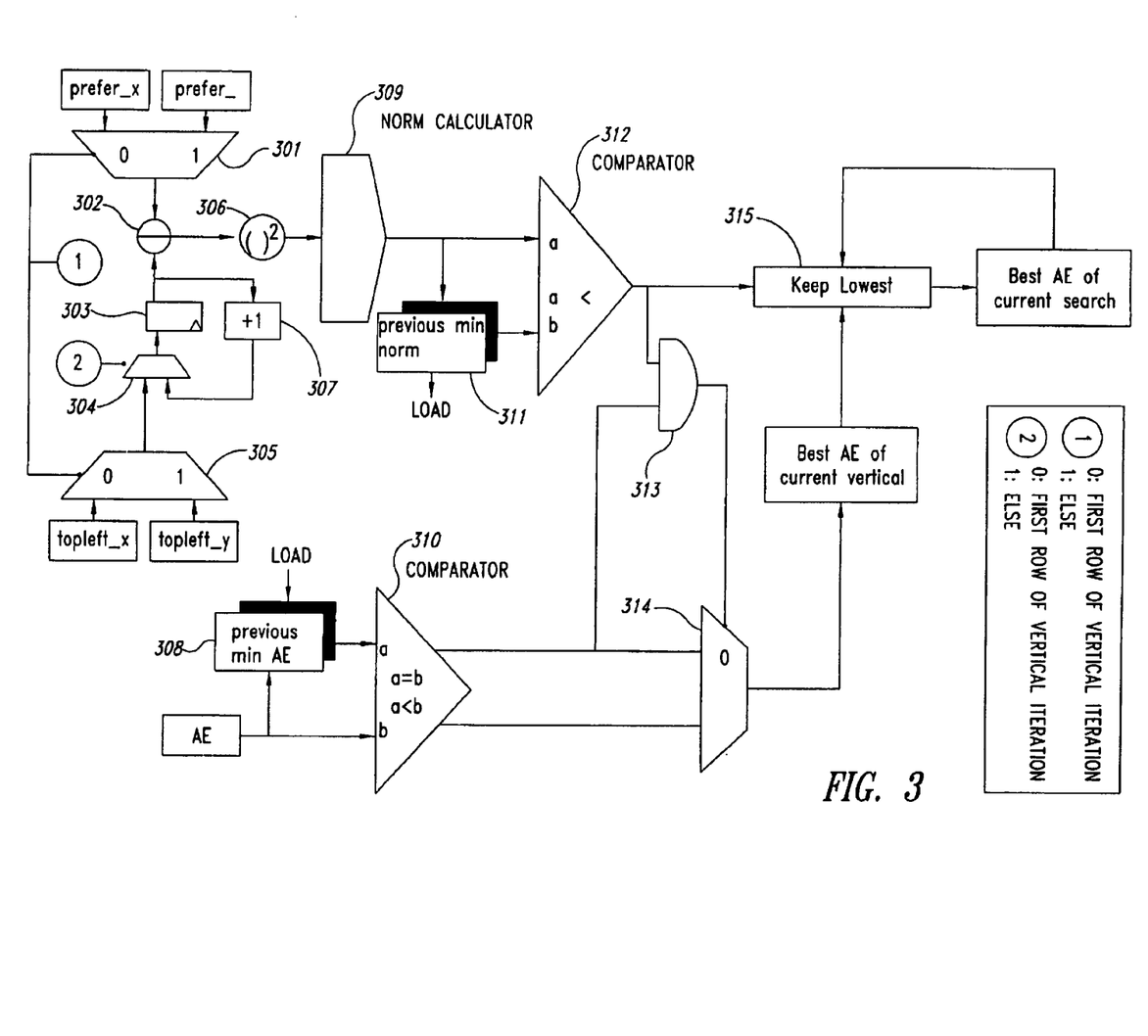
FIG. 3 is a block diagram illustrating an arrangement for performing motion estimation for every search position.

As shown in FIG. 3, when the scanning process begins at the first vertical iteration of a column in the search window, co-ordinate x of the top left corner of the current block and co-ordinate x of the preferred point are chosen as two inputs to a norm calculation circuit. A multiplex function is performed by circuit 301 and circuit 305. Subsequently the corresponding co-ordinate y of the same point and co-ordinate y of the preferred point are chosen as two inputs to the norm calculation circuit. For this first vertical iteration of the column, the input of co-ordinate y from circuit 305 is chosen. Circuit 304 performs this multiplexing function and the output of it is loaded into register 303. Circuit 302 performs the subtract operation for the two inputs of the chosen co-ordinate x and y from circuit 302 and circuit 303.

The output of the subtraction circuit 302 is input to the square circuit 306. After the square operation, each $X^2$ and $Y^2$ is input to a norm calculation circuit 309. The norm calculation circuit includes an adding function which is performed to complete the norm function and the $X^2$ is then loaded for subsequent norm calculation.

As well as being input to the subtraction circuit 302, the output of register 303 is also supplied as an input to circuit 307. This co-ordinate y value is incremented by 1 in circuit 307 This new value of co-ordinate y is the co-ordinate y of the next new vertical iteration in the same column. For a new vertical iteration, the value of co-ordinate y increases by one pixel. Register 303 and circuit 307 are used for calculating the increasing value of co-ordinate y corresponding to the vertical iteration. For a new vertical iteration, multiplexor 304 will choose the output signal from circuit 307, while the output signal of circuit 301 is the co-ordinate y of the preferred point. These two signals are input to the subtraction circuit 302 and then are applied to square circuit 306 as well as norm calculator 309 to produce a norm value for the current new vertical iteration with the $X^2$ value which has already been loaded. This sequence is repeated for every search position in the top-to-down scanning process until the bottom of the column is reached.

When there is a new horizontal iteration for a new column, the operation described above is repeated. By fixing the scanning order to top-to-down and left-to-right for the whole search window, the norm value is calculated for every search position by using one subtractor, one square circuit and 2 adders. Moreover, the results are obtained without any approximation and so the accuracy of the displacement of motion vector is guaranteed. However this design applies to a one systolic array implementation, and only one search position is scanned at any one time.

The AE value of every search position is calculated and is used to determine the best match block. Two AE values of different search points are compared to define the best AE of current vertical iteration. Comparator 310 has 2 inputs of AE value, one of which is the defined smallest AE value. For the comparison between these two AE values, the smaller AE value will be loaded into register 308 and kept as a defined smallest AE value. This value is used to compare with the incoming AE value from different search position. As well as being loaded as the smallest AE value into register 308, it will also be output to the next circuit and defined as the minimum AE value in the current vertical iteration. The comparison between norms for corresponding AE values is not needed. The norm value for the said minimum AE value will be loaded to the circuit 311 and circuit 315.

When the comparator 310 finds that the current search position has an equivalent AE value to the previously defined minimum AE value, a comparison between two norms is performed. The norm value for the current search point is calculated and output from norm calculator 309. This new norm value is compared with the norm corresponding to the defined minimum AE value which is stored in register 311. If the value of the norm of the current search position is smaller than the norm of the stored minimum AE, this new value will be loaded to the register 311 and also input to circuit 315. Circuit 313 will output an enable signal to circuit 314 for selecting a new minimum AE, and it is thus defined as the best AE for the current vertical iteration.

In circuit 315, the new defined minimum AE for the current vertical iteration is compared with the previous defined minimum AE value. If these two values are equal, the corresponding norm value is used to determine the displacement of the vector. Circuit 315 stores the smallest value of AE for the current search mode and its corresponding norm value. Comparison between two defined minimum AE values continues until the whole scanning process is completed. The output of circuit 315 is defined as the minimum AE for the current search mode and it represents the optimum displacement of vector for the motion estimation.

Other embodiments are applicable to multiple systolic array implementations, or parallel scanning of several search positions. Comparison of the norm value is based on the position of the scan point with reference to the preferred point in the search window. The search position which is closest to the preferred point is chosen to define the displacement of vector. Therefore, a sorter design is included to simplify the complexity of the circuit and reduce the cost of computation. In this embodiment, the search position is aligned to the same row (i.e., having the same y co-ordinate) and the comparison among the AEs is executed simultaneously.

Figure 4:
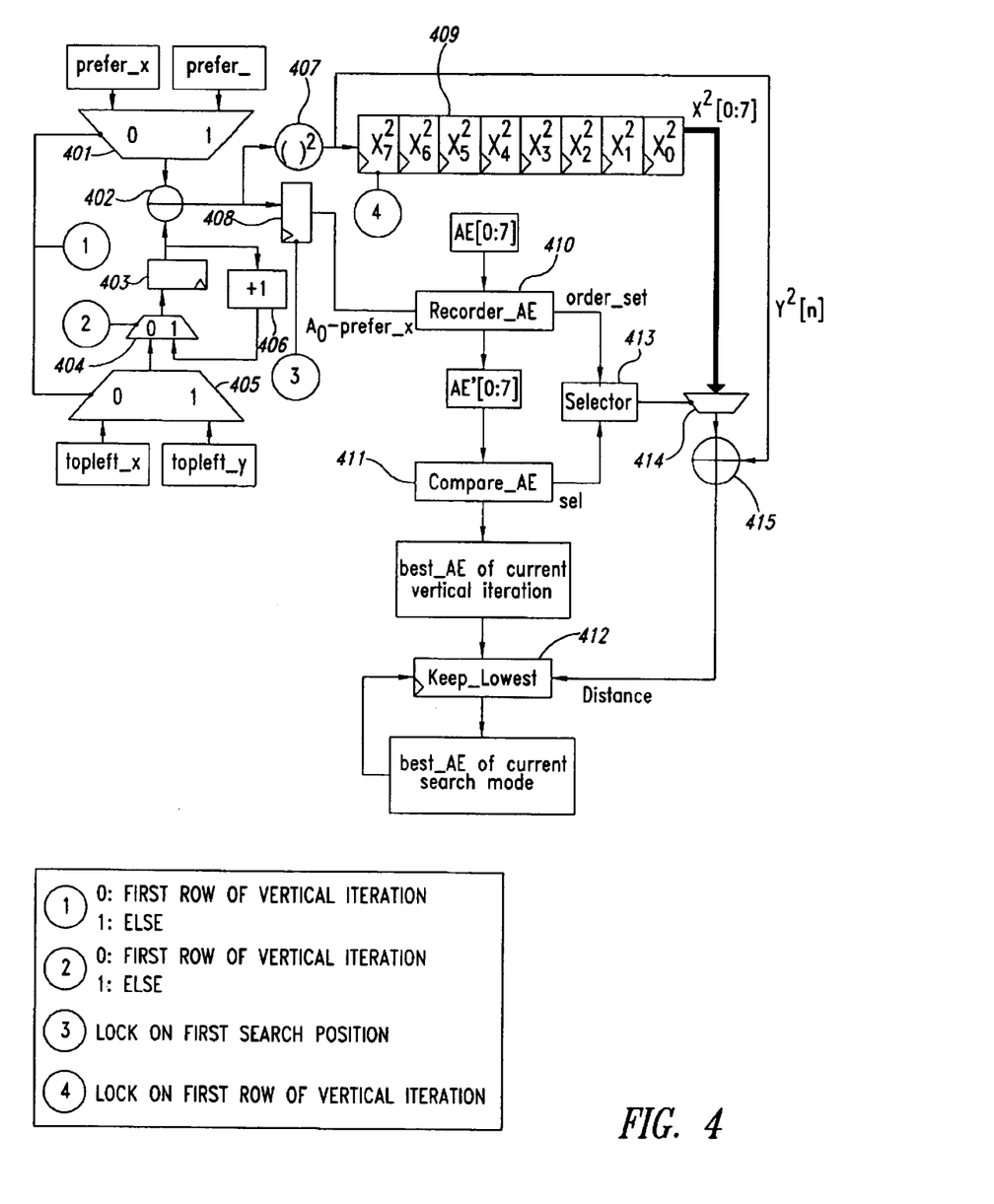
FIG. 4 is a block diagram illustrating an arrangement for determining the motion vector in accordance with a reordering scheme.

Referring to FIG. 4, the AEs of 8 search positions are compared simultaneously. The scanning order of the search process is fixed to left-to-right and top-to-down, as before. At the first row of search positions for a column of vertical iteration, the co-ordinate x of the first search position in the row is chosen as an input to the norm calculation circuit. Circuit 401 and 405 take care of this multiplex function where co-ordinate x of the current search position and the preferred point are selected. For the co-ordinate x of the current search position, circuit 404 outputs this signal and loads it into register 403 for outputting to subsequent circuits. The distance between the current search position and the previous search position is one pixel; therefore, register 403 and adder 406 are used to increase the value of co-ordinate x by one pixel for subsequent search positions in the same row. Circuit 404 chooses the co-ordinate x of the first search position of the row, and in conjunction with adder 406, increments this value for each subsequent search position.

Register 403 stores every output signal from circuit 404 and outputs it to the adder 406 as well as subtraction circuit 402 to perform the calculation: (topleft_x−prefer_x). The output from circuit 402 is passed to register 408 and square circuit 407. Register 408 stores only the subtraction result of (topleft_x−prefer_x) for the first search position, and here defines it as ($A_0$−prefer_x) which represents the column distance with respect to preferred point. Register 408 discards all other incoming subtraction results once the result of the first search position is complete. Meanwhile in square circuit 407, the subtraction result from circuit 402 is squared. The output of this circuit 407 is loaded into a register chain 409. Register chain 409 stores all the square results of 8 search positions and it is locked once all 8 square results are loaded.

When ($A_0$−prefer_x) is locked in register 408 and all $X^2$ results for the current row of search positions are locked in register chain 409, the norm calculation circuit is ready for co-ordinate y computation. By using the same circuit, the norm function calculation is performed for co-ordinate y. This simplifies the circuit design and allows the circuit to be reused. At the first vertical iteration of the column, co-ordinate y of the current row of search positions and co-ordinate y of the preferred point are chosen as inputs to norm calculation circuit. Circuit 401 and circuit 405 take care of this data selection. These inputs are used to perform the (topleft_y−prefer_y) operation. The subtraction result is then input to circuit 407 to perform a square operation and result of $Y^2$ is output to circuit 415.

The distance between co-ordinate y of the current vertical iteration and the next vertical iteration is horizontally one pixel. Therefore, co-ordinate y for a new vertical iteration is increased by one pixel. For a new vertical iteration, circuit 406 performs the adding operation for co-ordinate y, previously loaded into register 403. Circuit 404 ensures that when starting from the current vertical iteration until the bottom of the column, only the increased result from circuit 406 will be output to register 403. Register 403 outputs the increased co-ordinate y to subtraction circuit 402. Again, the same process is performed to produce the square result of $Y^2$. $Y^2$ of the current vertical iteration is calculated and meanwhile corresponding AEs of current row of search positions are input to the circuit for reordering and comparison.

The AEs of the current row of search positions are input to circuit 410 for reordering. The reorder process is based on the ($A_0$−prefer_x) value from register 408. There are 8 AE values to compare simultaneously and the order of the AEs is arranged with respect to co-ordinate x of first search position in the row. AO is the co-ordinate x of the first search position in the row and prefer_x represents the co-ordinate x of preferred point. ($A_0$−prefer_x) represents the column distance between these two co-ordinates x. If the result of ($A_0$−prefer_x) is equal to or greater than 0, then the order of AE values is maintained. If the value of ($A_0$−prefer_x) is equal to or less than −7, the order of AE values is reversed with respect to the original order. If the result of ($A_0$−prefer_x) is between −1 to −6, then the order of AE values is sorted according to the column distance of each search position with reference to preferred point. The search position with the smallest column distance has its AE placed at the beginning of the order. The order is thus proportional to the column distance.

Before the reordering, the AEs are ordered as the alignment of the search position in a row. Each AE is given a number according to the alignment of the search position, and the number increases from left to right. When the AEs are reordered, their representative number is also sorted in the same new order. This new order set is output to circuit 413. This order set is maintained so that the corresponding $X^2$ value can be traced back to where it is stored in register chain 409.

After the reordering, the new order set of AEs is output to circuit 411. This circuit is arranged to compare AEs. The AE with smallest value is chosen and defined as the best AE for the current vertical iteration. If there are equivalent AEs, the AE which is positioned first in the order set is chosen, since it is closer to the preferred point. When the selection of the best AE for the current vertical iteration is completed, the selection result is output to circuit 413. By using this arrangement, the search position closest to the preferred point is selected and stored.

The best AE of the current vertical iteration is compared to the best AE of the previous vertical iteration. In this case, the corresponding norm value is needed if there is equivalence between two AEs. $X^2$ values for 8 search positions are stored in register chain 409, and one of the $X^2$ values will be chosen corresponding to the defined best AE for the current vertical iteration. The selection is performed in circuit 414, and this selection is based on a selection signal from circuit 413. The output of circuit 413 is based on the order set and the selection result from circuit 411. The selection result from circuit 413 tells the selector 414 which AE is chosen from the reordered AEs. Referring to this selection result, the representative number for the chosen AE is obtained. This representative number is then output to circuit 414. Based on the representative number from selector 413, the corresponding $X^2$ value is chosen and output to adder 415.

In circuit 415, $X^2$ and $Y^2$ for the corresponding AE value is obtained, and the norm value is calculated. When the best AE of the current vertical iteration is equal to the best AE of the previous vertical iteration, the calculated norm from adder 415 is compared to the previous norm. The AE with the smaller norm value is chosen and stored in circuit 412. Circuit 412 keeps the smallest AE value and its corresponding norm, and the comparison is repeated for the next AE. When the scanning process for the whole search window is completed, the output of circuit 412 is defined as the best AE of the current search mode.

This circuit design uses only one subtractor, one square circuit and 2 adders to perform the norm calculation. It allows the comparison of 8 AEs or even more to be performed simultaneously. This helps avoid unnecessary computations and requires a less complex circuit design.

If $Norm_i$ of a current position i is ($X^2+Y^2$), the $Norm_{i+1}$ of next scan position i+1 is given by (($X+1)^2+Y^2$) or ($X^2+2X+1+Y^2$); hence $Norm_i = Norm_i+(2X+1)$. The square operations can be avoided during the scan by using previously stored norm values. With a fixed scanning order of the search window, for example left-to-right, top-to-down, a circuit is presented to implement $Norm_i+1=Norm_i+(2X+1)$.

Figure 5:
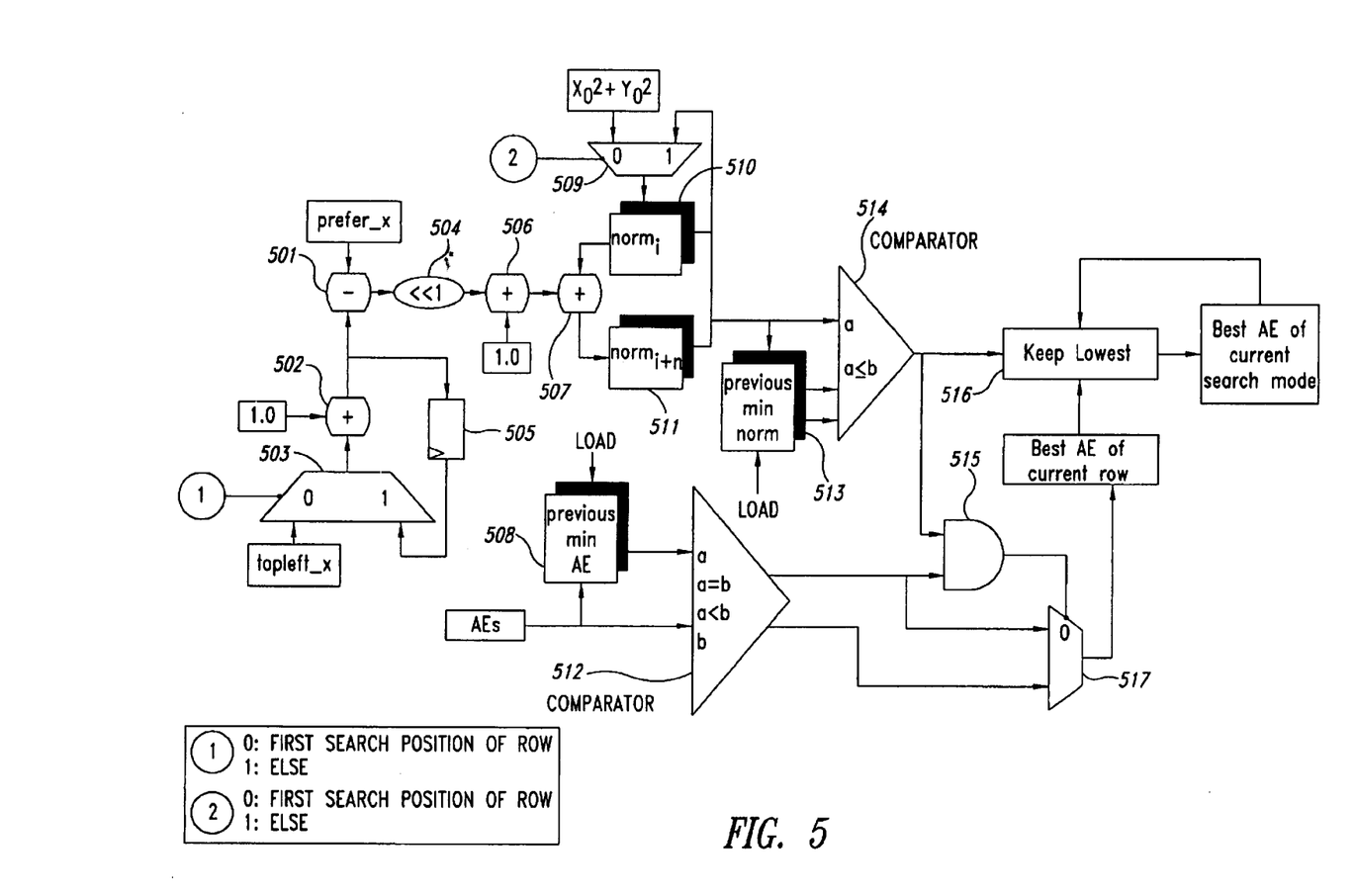
FIG. 5 is a block diagram illustrating an arrangement for determining the motion vector in accordance with the scheme: $Norm_{i+1} = Norm_i + (2X+1)$.

The implementation of the function is shown in FIG. 5. A row of search positions in the search is used to do the scanning process. Firstly, the norm of the first position in a row, ($x_0^2+y_0^2$) is loaded into a register for the subsequent norm calculation. To compute the norm for subsequent search positions, the X value is required. In circuit 503, input of co-ordinate x of the first search position in a row is chosen, and this input is incremented by 1 in adder 502. The output of adder 502 is passed to subtract circuit 501 as well as loaded into register 505. Register 505 is used to store all increased x, and output to selector 503. When the x value for the next search position is required, selector 503 will choose the output of register 505. The selector chooses the output of register 505 until the scanning process comes to the end of the row of search positions.

The value of prefer_x is input to subtract circuit 501. The output of adder 502 is used to subtract prefer_x, and X value is obtained at this point. The result of the subtraction is output to circuit 504. Circuit 504 is a one bit shifter which performs the same function as a multiply by 2 circuit. The output of circuit 504 is incremented by 1 in adder 506 and the value of (2X+1) is obtained. (2X+1) is added to the norm of the previous search position where has been loaded into register 510. Therefore, the norm of the second search position is obtained and loaded into register 511.

From register 511, the output is passed to comparator 514 and selector 509. For the first search position in a row, selector 509 chooses $(x_0^2+y_0^2)$ as its output. When the scanning process begins for the second search position, selector 509 selects the input from register 511 as its output. The norm of the current search position is stored in register 510, and used to compute the norm function for the search position next to it. The steps mentioned above are repeated until the scanning process for a row of search positions is complete. When a new row of search positions is used for the scanning process, the operation of the circuit starts from the beginning, but a new value of $(x_0^2+y_0^2)$ is required because the vertical position in the search window is changed. The value of co-ordinate x stays the same for as long as the row of search positions starts from the same horizontal position in the search window. The operation is repeated until the whole search window has been scanned. The outputs of register 510 and 511 are passed to comparator 514 when the corresponding AEs are compared. In comparator 514, the smaller norm is chosen as an output and loaded into register 513 for subsequent comparisons.

The AE of every search position is input to comparator 512 to determine the smallest AE. Register 508 is used to store the previous minimum AE for subsequent comparisons. If there is no equivalent value between the current AE and the previous minimum AE, the minimum AE is output to selector 517, and, by default, selector 517 chooses this minimum AE and outputs it as the best AE of the current row. However, when the current AE is equal to the previous minimum AE, the comparison of corresponding norms is required to determine the best AE. A selection signal is generated by circuit 515 to enable selector 517 to select the AE with the smaller norm as the best AE of the current row.

The best AE of the current row and its corresponding norm are input to circuit 516. In circuit 516, a comparison between the best AE of the current row and the previous best AE is performed. When there is equivalence between two AEs, then comparison of the corresponding norms is required, The AE with the smaller norm is chosen as the best AE of the current search mode and it is stored in circuit 516 as well as its corresponding norm. Implementation of $Norm_i+1=Norm_i+(2X+1)$ in the embodiment described above saves computation time and simplifies the design. This is because a square function is not required in the hardware design, and the square of X and Y can be performed in software before being input to the hardware circuit. This circuit design may be used in an arrangement for the parallel scanning of several search points when a register chain is added between registers 510 and 511.

The disclosed embodiments of a sorter in a norm calculation circuit allow pre-selection of the multiple scan positions and minimizes multiple calculations of the norm values as well as the comparisons required. With this invention, the norm calculation circuit requires one square circuit and one comparison. The comparison is only required when there is equivalence of AE value. The embodiments of the invention simplify the calculation method but do not change the norm function. This maintains a good performance for motion vector detection because the accuracy of the norm value is maintained and the accurate displacement of vector is obtained.

The provision of a sorter in the norm calculation circuit and the provision of a circuit that implements $Norm_i+1=Norm_i+(2X+1)$ allows the implementation of a multiple systolic array, or parallel scanning of several search positions. The searching process is executed simultaneously for the search positions aligned in a row. This allows the motion estimation process to be completed in a shorter time, as well as reducing the complexity of the circuits required to perform the process.

The present invention includes a novel feature or combination of features disclosed herein either explicitly or any generalization thereof regardless of whether or not it relates to the claimed invention or mitigates any or all of the problems addressed.

What is claimed is:

1. A method of selecting a motion vector for use in a motion estimation system, said motion vector defining movement of a block of pixels between a search window and a reference frame, said method comprising the steps of:

scanning a search window in a fixed order for a suitable match with an area of the reference frame such that each search position within a current row or column of the window is one pixel away from a previous search position;

defining a preferred point in the search window;

calculating a primary norm function with reference to the preferred point for a given position in each row or column;

calculating a norm function for each search position based on a linear increment of the primary norm function for the respective row or column;

calculating an Absolute Error (AE) for each search position, based on a difference between a given property of the search position and a position in the reference window; and     selecting a motion vector, the displacement of the motion vector defined in terms of the search position having the smallest AE, and when more than one search position has the same smallest AE, selecting the search position having the smallest norm function.

2. The method of claim 1 wherein the step of calculating the primary norm function for a given position includes the step of calculating the square of the distance between the preferred point and the current search point.

3. The method of claim 1 wherein the linear increment for a row or column is (1+2X) or (1+2Y) respectively, where X and Y refer to the respective coordinates of the current search position.

4. The method of claim 1 wherein a plurality of positions are searched simultaneously using a multiple systolic array arranged such that said plurality of positions are arranged in the same row or column.

5. The method of claim 4 wherein a pre-selected motion vector is determined on the basis of the AE calculations for said plurality of positions, and the motion vector is selected on the basis of the AE and norm functions of the pre-selected motion vectors.

6. The method of claim 5 wherein the calculated AE results for said plurality of positions are sorted according to the distance of their row or column position from the preferred point, and the pre-selected motion vectors are determined on the basis of the sorted AE results.

7. The method of claim 1 wherein the reference frame is one of a forward, backward, and interpolation frame as defined in MPEG standards.

8. The method of claim 1 wherein a Square Error (SE) calculation is performed in place of the Absolute Error (AE) calculation.

9. A motion estimation device for calculating a motion vector defining a displacement between a block of pixels in a search window and a block of pixels in a reference frame, including:

means for scanning a search window in a fixed order for a suitable match with an area of the reference frame such that each search position within a current row or column of the window is one pixel away from a previous search position;

means for defining a preferred point in the search window;

means for calculating a primary norm function with reference to the preferred point for a given position in each row or column;

means for calculating a norm function for each search position based on a linear increment of the primary norm function for the respective row or column;

means for calculating an Absolute Error (AE) for each search position, based on a difference between a given property of the search position and a position in the reference window;

means for selecting a motion vector, the displacement of the motion vector defined on the basis of the search position having the smallest AE, and when more than one search position has the same smallest AE, means for selecting the search position having the smallest norm function.

10. The device of claim 9, wherein the scanning means is configured to scan the search window pixels in a top-to-top down and left-to-right order.

11. The device of claim 10, wherein the means for calculating a norm value comprise one subtractor circuit, one square circuit, and two adder circuits.

12. The device of claim 9, wherein the means for selecting the search position having the smallest norm function comprise means for comparing the norm function associated with the search position of each of the same smallest AE.

13. The device of claim 9, further comprising means for selecting the reference frame to be one from among a forward frame, a backward frame, and an interpolation frame.

14. A method of selecting a motion vector for use in a motion estimation system, the motion vector defining movement of a block of pixels between a search window and a reference frame, the method comprising:

scanning a search window such that each search position is one pixel away from a previous search position;

calculating a primary norm function with reference to a preferred point for a given position;

calculating a norm function for each search position based on a linear increment of the primary norm function for a respective row or column;

calculating an Absolute Error (AE) for each search position; and selecting a motion vector having a displacement defined in terms of the search position having the smallest AE and the smallest norm function.

15. The method of claim 14, further comprising selecting a reference frame from one of among a forward frame, a backward frame, and an interpolation frame.

16. The method of claim 14, wherein calculated AE results for a plurality of positions are sorted according to a distance of their row or column position from the preferred point, and a pre-selected motion vector is determined on the basis of the sorted AE results, the pre-selected motion vector is used for the selection of the motion vector and the AE and norm functions.

* * * * *